US012763602B2

(12) United States Patent
Ahn et al.

(10) Patent No.: US 12,763,602 B2
(45) Date of Patent: Oct. 13, 2026

(54) ENERGY HARVESTING-BASED POWER SUPPLY SWITCHING DEVICE AND METHOD

(71) Applicant: KOREA ELECTRONICS TECHNOLOGY INSTITUTE, Seongnam-si (KR)

(72) Inventors: Hyunseuk Ahn, Seongnam-si (KR); Younghan Kim, Seoul (KR); Changseok Yoon, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 19/004,120

(22) Filed: Dec. 27, 2024

(65) Prior Publication Data

US 2026/0121449 A1 Apr. 30, 2026

Related U.S. Application Data

(63) Continuation of application No. PCT/KR2023/020627, filed on Dec. 14, 2023.

(30) Foreign Application Priority Data

Oct. 16, 2023 (KR) ........................ 10-2023-0137641

(51) Int. Cl.
*H02J 50/00* (2016.01)

(52) U.S. Cl.
CPC .................................. *H02J 50/001* (2020.01)

(58) Field of Classification Search
CPC ..................................................... H02J 50/001

(Continued)

(56) References Cited

U.S. PATENT DOCUMENTS

2010/0244573 A1* 9/2010 Karnick .................... H02J 7/34 307/80
2020/0014239 A1* 1/2020 Liu ........................... H02J 1/10

FOREIGN PATENT DOCUMENTS

JP 2009-159651 A 7/2009
JP 2021-002935 A 1/2021

(Continued)

OTHER PUBLICATIONS

Office Action in Korean Application No. 10-2023-0137641 dated Nov. 7, 2025.

(Continued)

*Primary Examiner* — Michael R. Fin
(74) *Attorney, Agent, or Firm* — Knobbe, Martens, Olson & Bear, LLP

(57) ABSTRACT

Proposed are an energy harvesting-based power supply switching device and a method thereof. An energy harvester may collect ambient energy and convert the collected energy into electric energy. An electric energy storage may store the converted electric energy. A plurality of power converters may convert the stored electric power into necessary electric power required by loads. A plurality of voltage supervisors monitor a voltage of power supplied from the power converters to the loads. A power supply switching unit switches supply of power from the power converters to the loads. A controller identifies the necessary power of the loads, then switches the supply of power by using the power supply switching unit based on an amount of the stored power and monitoring information received from the voltage supervisors, and performs power switching with one of the power switch and the ground switch according to the necessary power of the loads.

10 Claims, 5 Drawing Sheets

(58) Field of Classification Search
USPC ............................................................ 307/18
See application file for complete search history.

(56) References Cited

FOREIGN PATENT DOCUMENTS

| | | | |
|---|---|---|---|
| KR | 10-2010-0132008 | A | 12/2010 |
| KR | 10-2099939 | B1 | 4/2020 |
| KR | 10-2021-0041481 | A | 4/2021 |
| KR | 10-2021-0058346 | A | 5/2021 |
| KR | 10-2021-0126369 | A | 10/2021 |
| KR | 10-2356691 | B1 | 1/2022 |

OTHER PUBLICATIONS

International Search Report mailed Jul. 2, 2024 in International Application No. PCT/KR2023/020627, in 3 pages.

* cited by examiner

ENERGY HARVESTING-BASED POWER SUPPLY SWITCHING DEVICE AND METHOD

CROSS REFERENCE TO RELATED APPLICATIONS

This is a continuation application of International Patent Application No. PCT/KR2023/020627 filed on Dec. 14, 2023, which claims priority to Korean Patent Application No. 10-2023-0137641 filed on Oct. 16, 2023, the contents of each of which are incorporated herein by reference in their entirety.

BACKGROUND

Technical Field

The present disclosure relates to an energy harvesting-based device and method, and more particularly, to an energy harvesting-based power supply switching device and method for switching supply of power when generating operating power from ambient energy through energy harvesting and then supplying the power required for a plurality of loads.

Description of Related Technology

As the Internet of Things (IoT) technology spreads across a wide range of fields, the market for ultra-small/low-power IoT devices is expected to grow explosively. However, limitations in the power supplying scheme of IoT devices, such as battery replacement or power cord connection, are one of the obstacles to the spread of IoT services.

SUMMARY

One aspect is an energy harvesting-based power supply switching device and method for supplying power required for each of respective loads and efficiently controlling the supply of power.

Another aspect is an energy harvesting-based power supply switching device that includes an energy harvester that collects ambient energy and converts the collected energy into electric energy; an electric energy storage that stores the converted electric energy; a plurality of power converters that convert the electric power stored in the electric energy storage into necessary electric power required by loads and supply the converted energy; a plurality of voltage supervisors that monitor a voltage of power supplied from the plurality of power converters to the loads; a power supply switching unit having a power switch and a ground switch that switches supply of power from the plurality of power converters to the loads; and a controller that identifies the necessary power of the loads, then switches the supply of power to the loads by using the power supply switching unit based on an amount of power stored in the electric energy storage and monitoring information received from the plurality of voltage supervisors, and performs power switching with one of the power switch and the ground switch according to the necessary power of the loads.

The power converter may be connected to each of the loads through the power supply switching unit.

The controller may monitor whether the voltage of power to be supplied to each load reaches a threshold voltage, by using the plurality of voltage supervisors, disconnects the power converter that outputs power lower than the threshold voltage from the load by using the power supply switching unit when the voltage is lower than the threshold voltage, and connects the power converter that outputs power reaching the threshold voltage to the load by using the power supply switching unit when the voltage reaches the threshold voltage.

Based on the necessary power of the loads, the plurality of power converters may be connected to at least one load, so that an independent power converter can be connected to a first load whose required power is higher than a predetermined value, and one power converter can be connected in common to second loads whose required power is lower than the predetermined value.

The controller may perform power switching for the first load with a power switch, and perform power switching for the second loads with a ground switch.

The loads may constitute an IoT sensor, the first load may be a micro controller unit (MCU) in the IoT sensor, and the second loads may include at least one of sensors and data interface elements connected to the MCU.

The controller may monitors whether the voltage of power to be supplied to at least one load reaches a threshold voltage, by using the plurality of voltage supervisors, disconnect the power converter that outputs power lower than the threshold voltage from the load by using the power supply switching unit when the voltage is lower than the threshold voltage, and connect the power converter that outputs power reaching the threshold voltage to the load by using the power supply switching unit when the voltage reaches the threshold voltage.

The power converter may be a DC-DC converter.

The electric energy storage may include at least one of a secondary battery and a super capacitor.

The device may further include a boost charger that boosts the electric energy collected by the energy harvester to a voltage capable of charging the electric energy storage and then charges the electric energy storage.

In addition, the present disclosure provides an energy harvesting-based power supply switching method that includes, by a power supply switching device, collecting ambient energy with an energy harvester and converting the collected energy into electric energy; by the power supply switching device, storing the converted electric energy in an electric energy storage; and by the power supply switching device, converting the electric energy stored in the electric energy storage into necessary electric power required by loads by using a plurality of power converters, and then supplying the power.

Supplying the power may include, by the power supply switching device, monitoring a voltage of power supplied from the plurality of power converter to the loads with a plurality of voltage supervisor; and by the power supply switching device, switching supply of the power from the plurality of power converters to the loads with a power switch and a ground switch in a plurality of power supply switching units, wherein the power supply switching device checks the required power of the loads and then performs power switching with one of the power switch and the ground switch according to the required power of the loads based on an amount of power stored in the electric energy storage and monitoring information received from the plurality of voltage supervisors.

In addition, the present disclosure provides an energy harvesting-based system that includes a power supply switching device that collects ambient energy, converts the ambient energy into electric energy, stores the converted energy, and switches supply of stored power; and an IoT sensor including loads that operate by receiving power from the power supply switching device.

The power supply switching device according to the present disclosure can improve the operating efficiency of the energy harvesting-based system by switching the supply of power for the optimal operation of each load while monitoring the voltage of power output from the power converters for each load with the voltage supervisor.

When switching the supply of power, the power supply switching device according to the present disclosure can reduce the number of power converters and simplify the device hardware configuration by switching the supply of power using the power switch and the ground switch according to the power required for each load.

DETAILED DESCRIPTION

The energy harvesting technology is attracting attention as the power supplying technology for IoT devices. Based on the convergence of energy harvesting technology and IoT technology, research on batteryless operation technology or battery usage time extension technology for IoT devices is actively being conducted, and the demand in the related market is also increasing.

Energy sources for energy harvesting are sunlight, vibration, heat, wind, electromagnetic waves, etc., and the amount of energy collected from such energy sources ranges from microwatts (μW) to milliwatts (mW). Since only a small amount of energy is collected using the energy harvesting technology, IoT devices cannot operate until the power required is generated through energy harvesting. Furthermore, when an IoT device has two or more loads, the total power required by the two or more loads must be generated for stable operation.

However, since the power required for stable operation is different for each load, there is a latency time before the total power is generated, which causes inefficient operation of IoT devices.

In the following description, only parts necessary to understand embodiments of the present disclosure will be described, and other parts will not be described to avoid obscuring the subject matter of the present disclosure.

Terms used herein should not be construed as being limited to their usual or dictionary meanings. In view of the fact that the inventor can appropriately define the meanings of terms in order to describe his/her own invention in the best way, the terms should be interpreted as meanings consistent with the technical idea of the present disclosure. In addition, the following description and corresponding drawings merely relate to specific embodiments of the present disclosure and do not represent all the subject matter of the present disclosure. Therefore, it will be understood that there are various equivalents and modifications of the disclosed embodiments at the time of the present application.

Now, embodiments of the present disclosure will be described in detail with reference to the accompanying drawings.

Figure 1:
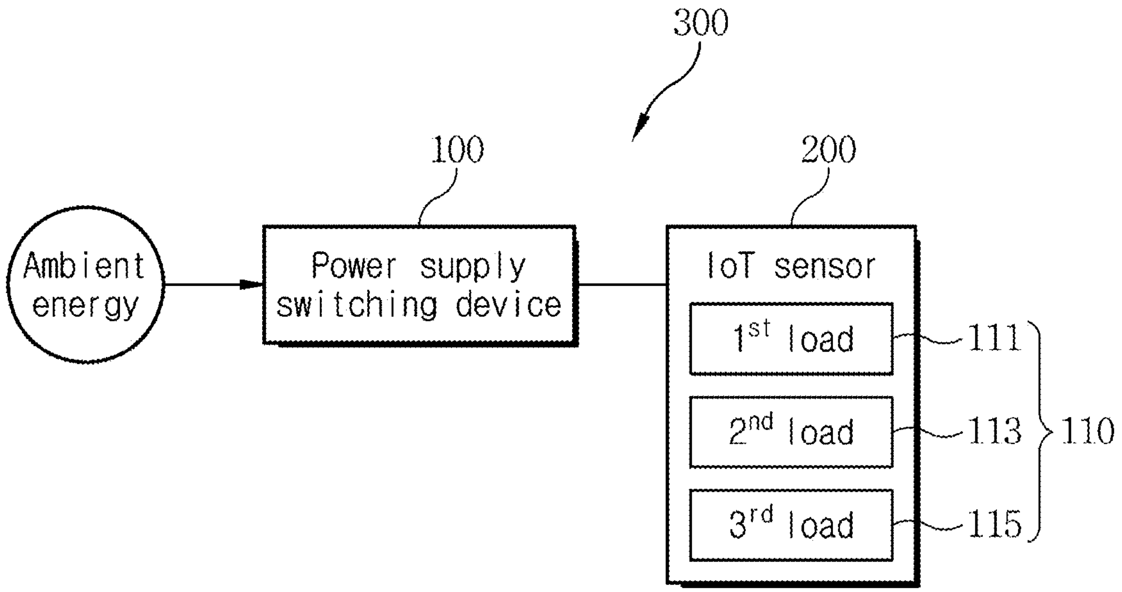
FIG. 1 is a block diagram showing an energy harvesting-based system according to an embodiment of the present disclosure.

FIG. 1 is a block diagram showing an energy harvesting-based system according to an embodiment of the present disclosure.

Referring to FIG. 1, the energy harvesting-based system 300 according to this embodiment is a system that operates while switching power based on ambient energy collected from the surroundings, and includes a power supply switching device 100 and an IoT sensor 200. The power supply switching device 100 collects ambient energy, converts the collected energy into electric energy, stores it, and switches the supply of the stored power. In addition, the IoT sensor 200 has loads 110 that operate by receiving power from the power supply switching device 100.

The harvesting-based system 300 according to this embodiment may be an IoT device. Sunlight, vibration, heat, wind, electromagnetic waves, etc. may be used as ambient energy sources for energy harvesting. The IoT device may be applied to various fields such as, but are not limited to, industrial/home IoT sensors, beacons, smart tags, rental bicycle theft prevention services, medical services, environmental monitoring services, building condition management services, agricultural and livestock management services, logistics services, medical patient management services, and remote environment monitoring services.

The IoT sensor 200 may include a plurality of loads 110. For example, the IoT sensor 200 may include, but is not limited to, first to third loads 111, 113, and 115. The first load 111 may be a micro controller unit (MCU), and the second and third loads 113 and 115 may be one of the sensors and data interface elements connected to the MCU.

The power supply switching device 100 according to this embodiment switches the supply of power so as to respectively supply the necessary power to the loads 110 based on the energy harvested power. That is, the power supply switching device 100 monitors whether the voltage of power to be supplied to each load 110 reaches a threshold voltage, and switches to supply power to the corresponding load 110 when the voltage reaches the threshold voltage. Of course, the power supply switching device 100 can turn off a switch at a voltage below the threshold voltage to block the supply of power to the corresponding load 110.

As such, the power supply switching device 100 according to the embodiment monitors and supplies the necessary power to each load 110, thereby respectively supplying the necessary power to the loads 110 and efficiently controlling the supply of power.

First Example: Power Supply Switching Device

Figure 2:
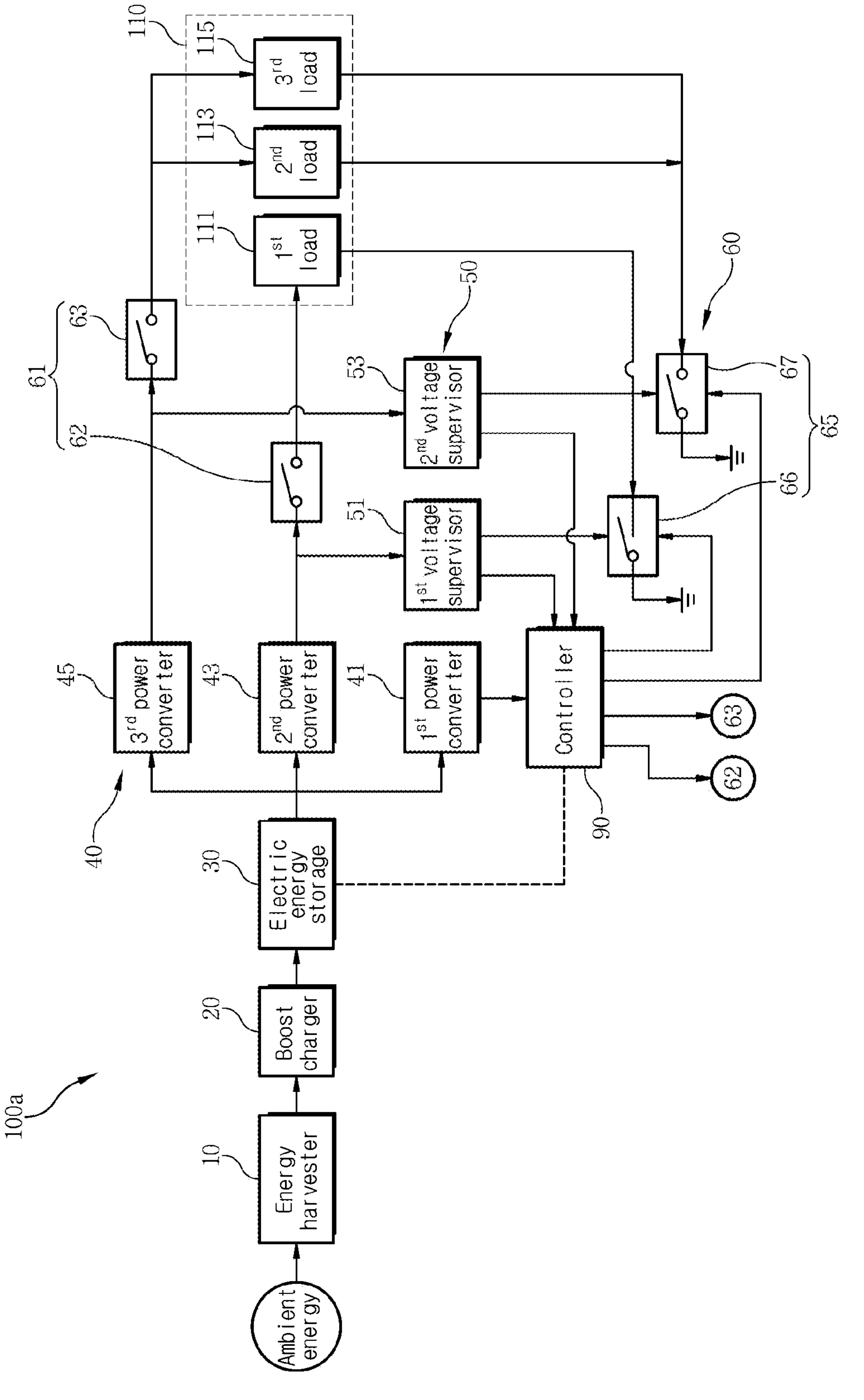
FIG. 2 is a block diagram showing a first example of a power supply switching device of FIG. 1.
Figure 3:
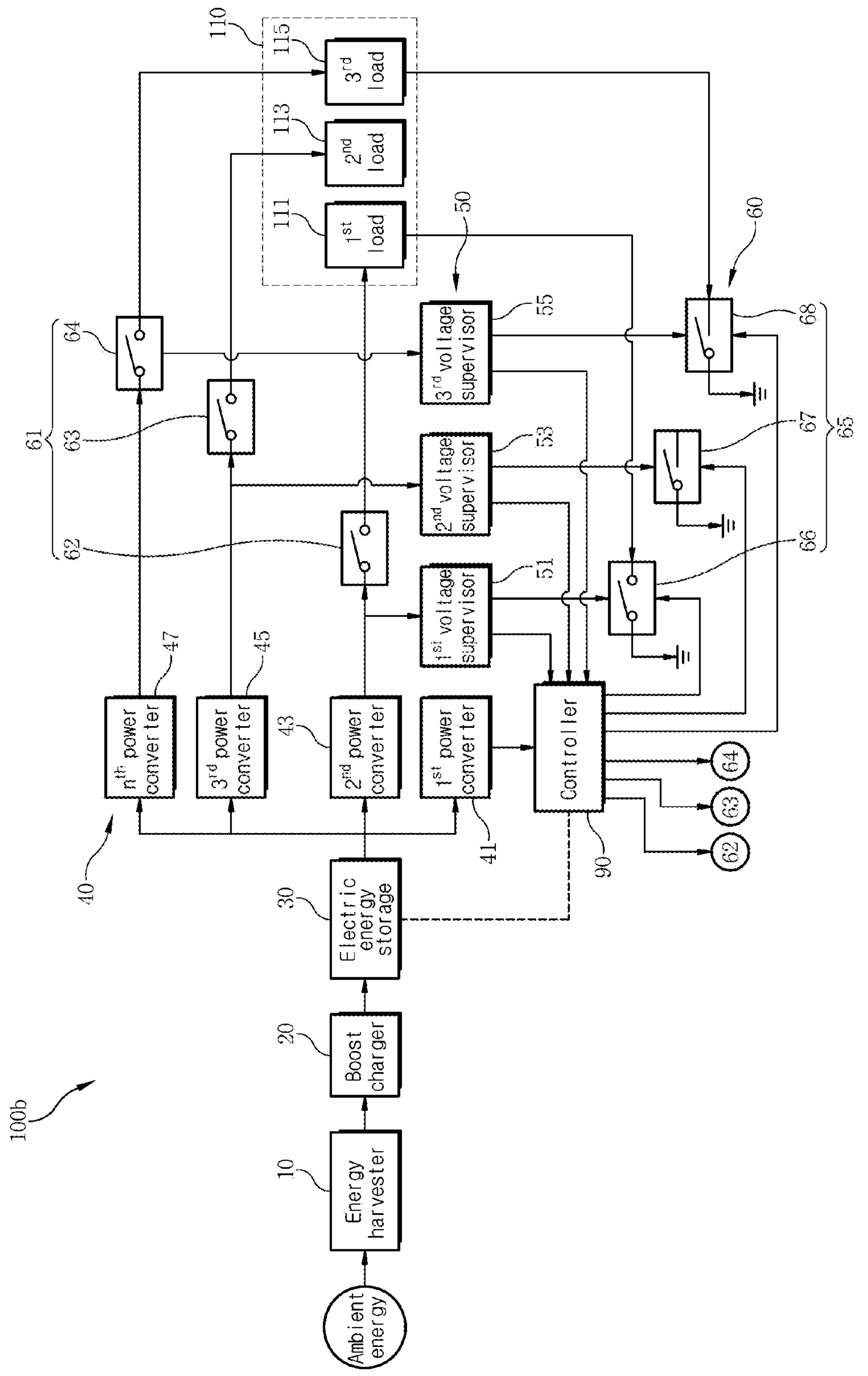
FIG. 3 is a block diagram showing a second example of a power supply switching device of FIG. 1.

Hereinafter, the power supply switching device 100 according to this embodiment will be described with reference to FIGS. 1 to 3. Here, FIG. 2 is a block diagram showing a first example of a power supply switching device of FIG. 1. In addition, FIG. 3 is a block diagram showing a second example of a power supply switching device of FIG. 1.

Referring to FIGS. 1 and 2, a power supply switching device 100*a* according to the first example includes an energy harvester 10, an electric energy storage 30, a plurality of power converters 40, a plurality of voltage supervisors 50, a power supply switching unit 60, and a controller 90. The energy harvester 10 collects ambient energy and converts it into electric energy. The electric energy storage 30 stores the converted electric energy. The plurality of power converters 40 convert electric power stored in the electric energy storage 30 into necessary electric power required by loads 110 and supply the converted electric power. The plurality of voltage supervisors 50 monitor the voltage of power supplied from the power converters 40 to the loads 110. The power supply switching unit 60 has a power switch 61 and a ground switch 65 that switch the supply of power from the plurality of power converters 40 to the loads 110. The controller 90 identifies the necessary power of the loads 110 and switches the supply of power to the loads 110 by using the power supply switching unit 60 based on the amount of power stored in the electric energy storage 30 and monitoring information received from the plurality of voltage supervisors 50. That is, the controller 90 performs power switching with one of the power switch 61 and the ground switch 65 according to the necessary power of the loads 110.

In addition, the power supply switching device **100*a* according to the first example may further include a boost charger 20**.

The energy harvester 10 performs energy harvesting by collecting ambient energy and converting it into electric energy. The energy harvester 10 includes an energy converter that collects ambient energy and converts it into DC power.

The electric energy storage 30 receives the converted electric energy from the energy harvester 10 and stores it. The electric energy storage 30 supplies the necessary power to each of the loads 110 under the control of the controller 90. The electric energy storage 30 includes at least one of a chargeable and dischargeable secondary battery and a super capacitor. The electric energy storage 30 may be composed of multiple units.

The boost charger 20 is interposed between the energy harvester 10 and the electric energy storage 30. The boost charger 20 boosts the electric energy collected by the energy harvester 10 to a voltage capable of charging the electric energy storage 30 and then charges the electric energy storage 30. Since the electric energy collected by the energy harvester 10 is a low power of the order of microwatts (μW) to milliwatts (mW), it is boosted by the boost charger 20 to charge the electric energy storage 30.

The plurality of power converters 40 convert the power stored in the electric energy storage 30 into the necessary power required by the loads 110 under the control of the controller 90 and supply it. The power converters 40 may be DC-DC converters.

To smoothly supply the necessary power to each of the loads 110 including the controller 90, the plurality of power converters 40 may be used. The plurality of power converters 40 may include a first power converter 41 for supplying necessary power to the controller 90, and second and third power converters 43 and 45 for supplying necessary power to the loads 110.

Based on the required power of the loads 110, the second and third power converters 43 and 45 may be connected to at least one load 110. The second power converter 43 may be independently connected to the first load 111 whose required power is higher than a predetermined value, and the third power converter 45 may be connected in common to the second and third loads 113 and 115 whose required power is lower than a predetermined value. That is, the first load 111 is a load having a relatively large power consumption, and the second and third loads 113 and 115 are loads having a relatively small power consumption compared to the first load 111. For example, when the loads 110 constitute the IoT sensor 200, the first load 111 may be an MCU in the IoT sensor 200, and the second and third loads 113 and 115 may include at least one of sensors and data interface elements connected to the MCU.

Meanwhile, in the first example, the second and third loads 113 and 115 are connected to the third power converter 45, but the disclosure is not limited to this example. For example, multiple loads 110 may be connected within a power value that can be output from one power converter 40. The number of power converters 40 may be designed based on the total required power value of the loads 40 and the power value that can be output from one power converter 40.

The plurality of voltage supervisors 50 monitor the voltage of power supplied from the power converter 40 to the loads 110. When the second and third power converters 43 and 45 are included, the voltage supervisors 50 may be configured in a number corresponding to the second and third power converters 43 and 45. Alternatively, the voltage supervisors 50 may be configured in a number corresponding to the number of loads 110. The voltage supervisors 50 transmit monitoring information to the controller 90.

The voltage supervisors 50 according to the first example includes first and second voltage supervisors 51 and 53. The first voltage supervisor 51 monitors the voltage of power supplied from the second power converter 43 to the first load 111. The second voltage supervisor 53 monitors the voltage of power supplied from the third power converter 45 to the second and third loads 113 and 115. In addition, although not shown, the voltage supervisors 50 may monitor the voltage of power supplied to the controller 90.

Meanwhile, in the first example, the second voltage supervisor 53 monitors the voltage of power output from the third power converter 45 in a line before it is branched off from the third power converter 45 to the second and third loads 113 and 115, but it is not limited thereto. For example, the voltage supervisor 50 may be connected to each line branched off from the third power converter 45 to the second and third loads 113 and 115 to monitor the voltage of power applied to the second and third loads 113 and 115.

The power supply switching unit 60 switches the supply of power under the control of the controller 90. The power supply switching unit 60 may include a power switch 61 and a ground switch 65.

The power switch 61 may be configured in multiple units corresponding to the second and third power converters 43 and 45. Alternatively, the power switch 61 may be configured in a number corresponding to the number of the loads 110. The power switch 61 is connected between the second and third power converters 43 and 45 and the load 110. The voltage supervisor 50 is connected between the second and third power converters 43 and 45 and the power switch 61.

The power switch 61 includes first and second power switches 62 and 63.

The first power switch 62 is connected between the second power converter 43 and the first load 111. The second power switch 63 is connected on a line before branched off from the third power converter 45 to the second and third loads 113 and 115. At this time, the first voltage supervisor 51 monitors the voltage of power output from the second power converter 43 to the first power switch 62. The second voltage supervisor 53 monitors the voltage of power output from the third power converter 45 to the second power switch 63.

The ground switch 65 may be configured in a number corresponding to the number of the voltage supervisors 50 or the number of the loads 110. The plurality of ground switches 65 are respectively connected to corresponding loads 110.

The ground switch 65 includes a first ground switch 66 and a second ground switch 67. The first ground switch 66 is connected to the first load 111. The second ground switch 67 is connected in parallel to the second and third loads 113 and 115. The first and second voltage supervisors 51 and 53 that monitor the power applied to the loads 110 are connected to the first and second ground switches 66 and 67 to which the corresponding loads 110 are connected.

As will be described later, the on/off of the power switch 61 and the ground switch 65 is performed by the controller 90. That is, the power switch 61 and the ground switch 65 are connected to the controller 90.

In addition, the controller 90 controls the overall operation of the power supply switching device 100*a*. That is, the controller 90 switches the supply of power to the loads 110 based on the energy harvested surrounding energy.

The controller 90 can switch the supply of power as follows.

The controller 90 checks the required power of the loads 110. The required power of the loads 110 is provided to the controller 90 at step of configuring the energy harvesting-based system 300. The controller 90 checks the amount of power stored in the electric energy storage 30 and monitoring information received from the plurality of voltage supervisors 50. The controller 90 switches the supply of power to the loads 110 using the power supply switching unit 60 and performs the power switching with one of the power switch 61 and the ground switch 65 according to the required power of the loads 110.

Using the voltage supervisor 50, the controller 90 monitors whether the voltage of power to be supplied to each load 110 reaches a threshold voltage.

When the voltage detected by the voltage supervisor 50 is lower than the threshold voltage, the controller 90 disconnects the second and third power converters 43 and 45 from the load 110 by using the power supply switching unit 60. When the threshold voltage is reached, the controller 90 connects the second and third power converters 43 and 45 to the load 110 by using the power supply switching unit 60. That is, the controller 90 disconnects the second and third power converters 43 and 45 that output power lower than the threshold voltage from the load 110 by using the power supply switching unit 60, and connects the second and third power converters 43 and 45 that output power reaching the threshold voltage to the load 100 by using the power supply switching unit 60.

The controller 90 according to the first example can perform power switching for the first load 111 with the first power switch 62, and perform power switching for the second and third loads 113 and 115 with the second ground switch 67.

At this time, even if the second and third loads 113 and 115 are grouped and connected to one third power converter 45, power switching for the second and third loads 113 and 115 can be performed using the second ground switch 67.

As described above, the power supply switching device 100*a* according to the first example can improve the operating efficiency of the energy harvesting-based system 300 by switching the supply of power for the optimal operation of each load 110 while monitoring the voltage of power output from the second and third power converters 43 and 45 for each load 110 with the voltage supervisor 50.

In addition, the power supply switching device 100*a* according to the first example can reduce the number of power converters 40 and simplify the device hardware configuration by switching the supply of power using the power switch 61 and the ground switch 65 according to the power required for each load 110 when switching the supply of power.

Second Example: Power Supply Switching Device

Meanwhile, in the power supply switching device 100*a* according to the first example, the second power converter 43 is independently connected to the first load 111 whose required power is higher than a certain value, and the third power converter 45 is connected in common to the second and third loads 113 and 115 whose required power is lower than a certain value, but the disclosure is not limited thereto. For example, as illustrated in FIG. 3, power converters 45 and 47 may be connected independently and respectively to the second and third loads 113 and 115 whose required power is lower than a certain value.

Referring to FIGS. 1 and 3, the power supply switching device 100*b* according to the second example is identical to that in the first example in that it includes the energy harvester 10, the electric energy storage 30, the power converters 40, the voltage supervisors 50, the power supply switching unit 60, and the controller 90.

However, the power supply switching device 100*b* according to the second example is different in that it includes a number of power converters 43, 45, and 47 corresponding to the number of loads 110.

That is, in the power supply switching device 100*a* according to the first example, the second power converter 43 is independently connected to the first load 111 whose required power is higher than a predetermined value, and the third power converter 45 is connected in common to the second and third loads 113 and 115 whose required power is lower than a predetermined value.

On the other hand, in the power supply switching device 100*b* according to the second example, the power converters 43, 45, and 47 are connected independently and respectively to the corresponding first to third loads 111, 113, and 115. The voltage supervisor 50 is connected to lines for supplying power from the power converters 43, 45, and 47 to the first to third loads 111, 113, and 115, respectively. That is, the second to fourth power converters 43, 45, and 47 are independently connected to the first to third loads 111, 113, and 115, respectively.

First to third power switches 62, 63, and 64 are connected between the second to fourth power converters 43, 45, and 47 and the first to third loads 111, 113, and 115, respectively. First to third voltage supervisors 51, 53, and 55 are connected between the second to fourth power converters 43, 45, and 47 and the first to third power switches 62, 63, and 64, respectively.

First to third ground switches 66, 67, and 68 are connected to the first to third loads 111, 113, and 115, respectively. The first to third voltage supervisors 51, 53, and 55 are connected to the first to third ground switches 66, 67, and 68, respectively.

Accordingly, the power supply switching device 100*b* according to the second example can switch the supply of power to the first to third loads 111, 113, and 115 by using the power switch 61 and the ground switch 65. That is, using the plurality of voltage supervisors 50, the controller 90 monitors whether the voltage of power to be supplied to each load 130 from the plurality of power converters 43, 45, and 47 reaches a threshold voltage. If it is lower than the threshold voltage, the controller 90 disconnects the power converters 43, 45, and 47 that output power lower than the threshold voltage from the load 110 by using the power supply switching unit 60. If it reaches the threshold voltage, the controller 90 connects the power converters 43, 45, and 47 that output power reaching the threshold voltage to the load 110 by using the power supply switching unit 60. For example, the controller 90 can perform power switching for the first load 111 with the first power switch 62, and perform power switching for the second and third loads 113 and 115 with the second and third ground switches 67 and 68.

As such, the power supply switching device 100*b* according to the second example connects the power converters 43, 45, and 47 to the plurality of loads 110, respectively, so that the hardware configuration becomes somewhat complicated as the number of power converters 43, 45, and 47 increases, but it has the advantage of being able to stably supply the required power for each load 110.

Energy Harvesting-Based Power Supply Switching Method

Figure 4:
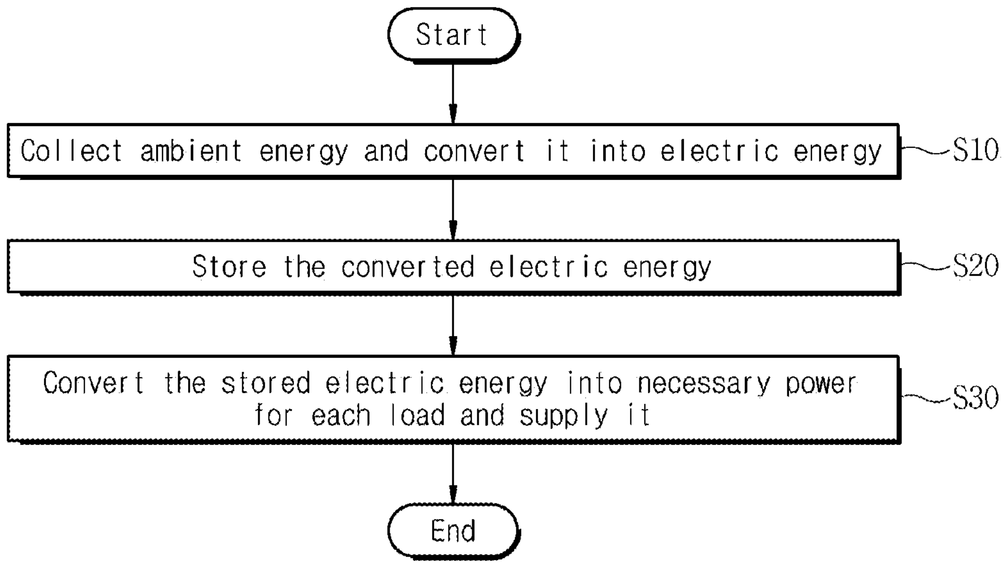
FIG. 4 is a flow diagram showing an energy harvesting-based power supply switching method and FIG. 5 is a detailed flow diagram for the supplying step of FIG. 4, according to an embodiment of the present disclosure.
Figure 5:
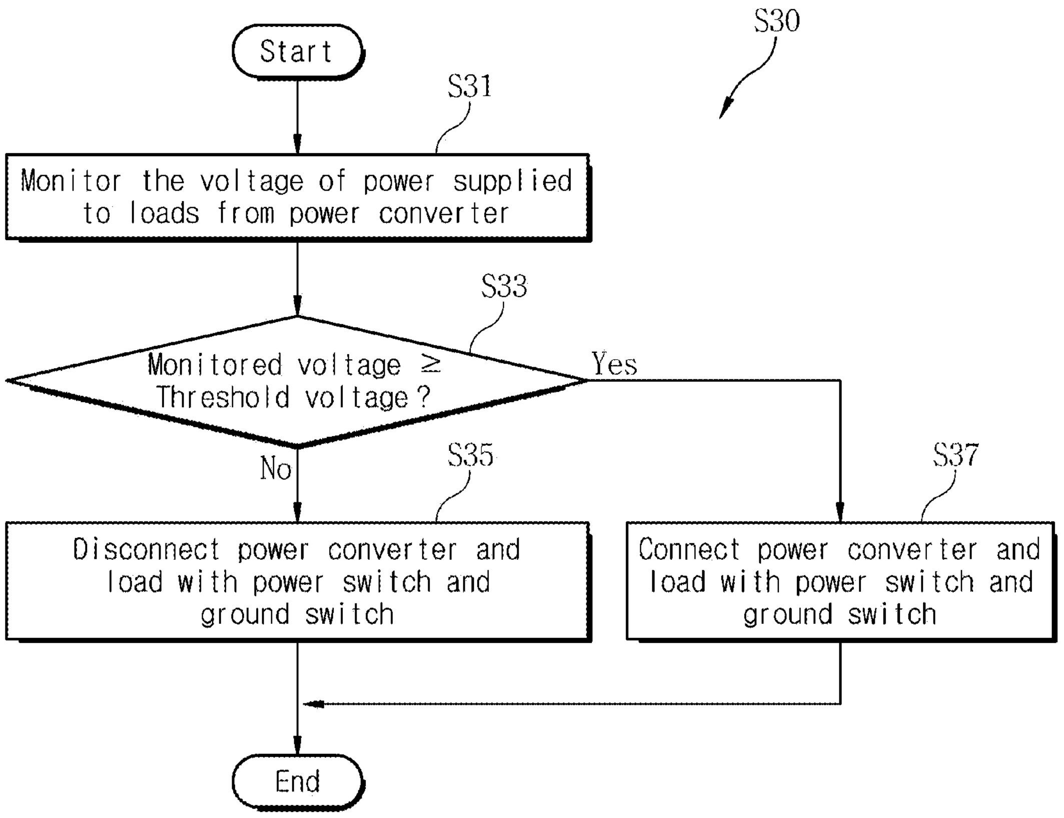

Hereinafter, an energy harvesting-based power supply switching method using the power supply switching device 100*a* or 100*b* according to the above embodiment will be described with reference to FIGS. 2 to 5. Here, FIG. 4 is a flow diagram showing an energy harvesting-based power supply switching method according to an embodiment of the present disclosure. In addition, FIG. 5 is a detailed flow diagram for the supplying step of FIG. 4.

First, in step S10, the power supply switching device 100*a* or 100*b* collects ambient energy with the energy harvester 10 and converts it into electric energy.

Next, in step S20, the power supply switching device 100*a* or 100*b* stores the converted electric energy in the electric energy storage 30.

Then, in step S30, using the power converter 40, the power supply switching device 100*a* or 100*b* converts the electric energy stored in the electric energy storage 30 into the necessary electric power required by the loads 110 and supplies it.

Step S30 may be performed as shown in FIG. 5.

In step S31, the power supply switching device 100*a* or 100*b* monitors the voltage of power supplied from the power converter 40 to each of the loads 110 with the voltage supervisor 50.

In addition, the power supply switching device 100*a* or 100*b* switches the supply of power from the power converter 40 to the loads 110 with the power switch 61 and the ground switch 65 of the power supply switching unit 60 in steps S33 and S35. That is, the power supply switching device 100*a* or 100*b* checks the required power of the loads 110 and then performs power switching with one of the power switch 61 and the ground switch 65 according to the required power of the loads 110 based on the amount of power stored in the electric energy storage 30 and monitoring information received from the voltage supervisor 50.

In step S33, using the voltage supervisor 50, the power supply switching device 100*a* or 100*b* monitors whether the voltage of power to be supplied to each load 110 reaches a threshold voltage. That is, the power supply switching device 100*a* or 100*b* determines whether the monitored voltage is higher than the threshold voltage.

If the monitored voltage is lower than the threshold voltage, in step S35, the power supply switching device 100*a* or 100*b* disconnects the power converter 40 and the load 110 with the power supply switching unit 60. At this time, if the power converter 40 and the load 110 are in a disconnected state, the power supply switching device 100*a* or 100*b* maintains the disconnected state of the power supply switching unit 60.

If the monitored voltage reaches the threshold voltage, in step S37, the power supply switching device 100*a* or 100*b* connects the power converter 40 and the load 110 with the power supply switching unit 60. At this time, if the power converter 40 and the load 110 are in a connected state, the power supply switching device 100*a* or 100*b* maintains the connected state of the power supply switching unit 60.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. An energy harvesting-based power supply switching device comprising:

an energy harvester configured to collect ambient energy and convert the collected energy into electric energy;

an electric energy storage configured to store the converted electric energy;

a plurality of power converters configured to convert the electric power stored in the electric energy storage into necessary electric power required by loads and supply the converted energy;

a plurality of voltage supervisors configured to monitor a voltage of power supplied from the plurality of power converters to the loads;

a power supply switching unit comprising a power switch and a ground switch configured to switch supply of power from the plurality of power converters to the loads; and a controller configured to:

identify the necessary power of the loads, then switch the supply of power to the loads by using the power supply switching unit based on an amount of power stored in the electric energy storage and monitoring information received from the plurality of voltage supervisors, and perform power switching with one of the power switch and the ground switch according to the necessary power of the loads, wherein the plurality of power converters comprise:

a first power converter connected to a first load of the loads whose required power is higher than a predetermined value via a first power switch of the power supply switching unit; and a second power converter connected in common to a plurality of second loads of the loads whose required power is lower than the predetermined value via a second power switch that is located on a line before the line branches to the plurality of second loads, wherein the power supply switching unit further includes a ground switch connected in parallel to the plurality of second loads and configured to perform power switching for the plurality of second loads by switching a ground connection.

2. The device of claim 1, wherein each of the plurality of power converters is connected to one or more of the loads through the power supply switching unit.

3. The device of claim 1, wherein the loads constitute an IoT sensor, and wherein the first load is a micro controller unit (MCU) in the IoT sensor, and the plurality of second loads include at least one of sensors or data interface elements connected to the MCU.

4. The device of claim 1, wherein each of the plurality of power converters is a DC-DC converter.

5. The device of claim 1, wherein the electric energy storage includes at least one of a secondary battery and a super capacitor.

6. The device of claim 1, further comprising:

a boost charger configured to boost the electric energy collected by the energy harvester to a voltage capable of charging the electric energy storage and then charge the electric energy storage.

7. An energy harvesting-based power supply switching method comprising:

by a power supply switching device, collecting ambient energy with an energy harvester and converting the collected energy into electric energy;

by the power supply switching device, storing the converted electric energy in an electric energy storage; and by the power supply switching device, converting the electric energy stored in the electric energy storage into necessary electric power required by loads by using a plurality of power converters, and then supplying the power, wherein supplying the power includes:

by the power supply switching device, monitoring a voltage of power supplied from the plurality of power converter to the loads with a plurality of voltage supervisor; and by the power supply switching device, switching supply of the power from the plurality of power converters to the loads with a power switch and a ground switch in a plurality of power supply switching units, wherein the power supply switching device checks the required power of the loads and then performs power switching with one of the power switch and the ground switch according to the required power of the loads based on an amount of power stored in the electric energy storage and monitoring information received from the plurality of voltage supervisors, wherein supplying the power further comprises:

supplying power from a first power converter of the plurality of power converters to a first load of the loads whose required power is higher than a predetermined value by switching a first power switch of the power supply switching unit;

supplying power from a second power converter of the plurality of power converters in common to a plurality of second loads of the loads whose required power is lower than the predetermined value by switching a second power switch located on a line before the line branches to the plurality of second loads; and performing power switching for the plurality of second loads by switching a ground connection via a ground switch connected in parallel to the plurality of second loads.

8. An energy harvesting-based system comprising:

a power supply switching device configured to collect ambient energy, convert the ambient energy into electric energy, store the converted energy, and switch supply of stored power; and an IoT sensor including loads configured to operate by receiving power from the power supply switching device, wherein the power supply switching device comprises:

an energy harvester configured to collect the ambient energy and convert the collected energy into the electric energy;

an electric energy storage configured to store the converted electric energy;

a plurality of power converters configured to convert the electric power stored in the electric energy storage into necessary electric power required by each of the loads and supply the converted energy;

a plurality of voltage supervisors configured to monitor a voltage of power supplied from the plurality of power converters to the loads;

a power supply switching unit comprising a power switch and a ground switch configured to switch supply of power from the plurality of power converters to the loads; and a controller configured to:

identify the necessary power of the loads, then switch the supply of power to the loads by using the power supply switching unit based on an amount of power stored in the electric energy storage and monitoring information received from the plurality of voltage supervisors, and perform power switching with one of the power switch and the ground switch according to the necessary power of the loads, wherein the plurality of power converters comprise:

a first power converter connected to a first load of the loads whose required power is higher than a predetermined value via a first power switch of the power supply switching unit; and a second power converter connected in common to a plurality of second loads of the loads whose required power is lower than the predetermined value via a second power switch that is located on a line before the line branches to the plurality of second loads, wherein the power supply switching unit further includes a ground switch connected in parallel to the plurality of second loads and configured to perform power switching for the plurality of second loads by switching a ground connection.

9. The device of claim 1, wherein the controller is configured to, using the plurality of voltage supervisors, disconnect a respective power converter from a corresponding load when a monitored voltage supplied to the load is below a threshold voltage, and connect the respective power converter to the corresponding load when the monitored voltage reaches the threshold voltage.

10. The device of claim 1, wherein:

the second power switch is coupled to an output of the second power converter on a single line prior to branching to the plurality of second loads, and the ground switch is coupled to ground terminals of the plurality of second loads on respective return paths, such that the plurality of second loads are selectively powered or depowered as a group by switching only the ground connection while maintaining a common supply line from the second power converter.

* * * * *